(12) United States Patent
Hensen

(10) Patent No.: US 9,080,325 B1
(45) Date of Patent: Jul. 14, 2015

(54) NAIL PLATE HANGER WITH BENDABLE TABS

(71) Applicant: Simpson Strong-Tie Company, Inc., Oakland, CA (US)

(72) Inventor: Sam Thomas Hensen, Prosper, TX (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 14/224,081

(22) Filed: Mar. 25, 2014

(51) Int. Cl.
| | | |
|---|---|---|
| *E04B 1/32* | (2006.01) | |
| *E04B 7/08* | (2006.01) | |
| *E04B 1/26* | (2006.01) | |
| *F16B 15/00* | (2006.01) | |

(52) U.S. Cl.
CPC .......... *E04B 1/2608* (2013.01); *F16B 15/0046* (2013.01)

(58) Field of Classification Search
CPC ........................... E04B 1/2608; F16B 15/0046
USPC .................................................... 52/643, 633
See application file for complete search history.

(56) References Cited

U.S. PATENT DOCUMENTS

| | | |
|---|---|---|
| 409,546 A | 8/1889 | Zeigler |
| 3,416,821 A | 12/1968 | Benno |
| 3,945,741 A | 3/1976 | Wendt |
| 4,198,175 A | 4/1980 | Knepp et al. |
| 4,297,048 A | 10/1981 | Jureit et al. |
| 4,455,805 A | 6/1984 | Rionda et al. |
| 4,555,887 A | 12/1985 | Rionda et al. |
| 5,138,810 A * | 8/1992 | Kartler ............................ 52/254 |
| 5,380,116 A * | 1/1995 | Colonias .................... 403/232.1 |
| 5,419,649 A * | 5/1995 | Gilb .............................. 403/231 |
| 5,531,052 A | 7/1996 | Agar |
| 5,735,087 A | 4/1998 | Olden |
| 5,896,716 A | 4/1999 | Jalla |
| 5,950,392 A | 9/1999 | Short et al. |
| 6,158,188 A | 12/2000 | Shahnazarian |
| 6,171,043 B1 | 1/2001 | Williams |
| 6,230,467 B1 * | 5/2001 | Leek ............................... 52/702 |
| 6,295,781 B1 * | 10/2001 | Thompson ...................... 52/712 |
| 6,308,469 B1 | 10/2001 | Leung |
| 6,375,379 B1 | 4/2002 | Jefferies |
| 6,536,179 B2 | 3/2003 | Little |
| 6,931,804 B2 | 8/2005 | Trarup et al. |
| 7,021,879 B2 | 4/2006 | Taneichi |
| 7,200,972 B1 | 4/2007 | Freeman et al. |
| 2009/0301026 A1 | 12/2009 | Kaczmarek et al. |

FOREIGN PATENT DOCUMENTS

| | | |
|---|---|---|
| AU | 61049/90 | 2/1991 |
| AU | 200056480 B3 | 2/2001 |

(Continued)

OTHER PUBLICATIONS

"Re-Defining the Standard: Plated Truss Connectors; Angles and Straps", USP Lumber Connectors Full Line Catalog 2000. Three pages including cover page. USP Structural Connectors, 2000, USA.

*Primary Examiner* — Mark Wendell
(74) *Attorney, Agent, or Firm* — James R. Cypher; Charles R. Cypher

(57) ABSTRACT

A building connection between a first structural member and a second structural member made with a nail prong plate connector that has integral tabs. The second structural member supports the first structural member.

17 Claims, 14 Drawing Sheets

(56) References Cited

FOREIGN PATENT DOCUMENTS

| | | | |
|---|---|---|---|
| EP | 1167779 | A2 | 1/2002 |
| EP | 1275856 | A2 | 1/2003 |
| GB | 2250795 | A | 12/1990 |
| GB | 2465530 | B | 3/2012 |
| WO | WO03/093594 | A1 | 11/2003 |

* cited by examiner

NAIL PLATE HANGER WITH BENDABLE TABS

BACKGROUND OF THE INVENTION

Plated trusses are trusses, most often roof trusses that join the tops of building walls and support the roof sheathing, in which the truss chords, typically wood, are joined together using truss connector plates. A truss connector plate is a kind of tie. A truss connector plate is typically manufactured from ASTM A653/A653M, A591, A792/A792M, or A167 structural quality steel that is protected with zinc or zinc-aluminum alloy coatings or their stainless steel equivalent. These metal connector plates have integral teeth and are manufactured in various sizes (that is, length and width) and thicknesses, or gauges, and are designed to laterally transmit loads in wood. These plates are also known as stud ties, metal connector plates, mending plates, or nail plates. Not all types of nail plates are approved for use in trusses and other structurally critical placements. Nail plates are used to connect timber of the same thickness in the same plane. When used on trusses, they are pressed into the side of the timber using special hydraulic tools. As the plate is pressed in, the nails are all "driven" simultaneously and the compression between adjacent nails reduces the tendency to split. When one truss, such as a girder or hip truss, is used to support another truss, such as a jack truss, that abuts against it, a separate connector is usually required. The present invention is preferably a nail plate with integral tabs that allow the nail plate to function as a hanger at the abutting end of the supported truss.

SUMMARY OF THE INVENTION

An object of the present invention is to provide a connector with attachment tabs that are attached away from the perimeter edge of the body of the connector, the body and attachment tabs being attached to two separate structural members. This allows the body to have a broad area of attachment to one of the structural members while the tabs are attached to the other structural member.

An object of the present invention is to provide a connector with a body that surrounds the tabs bent out of it, the bends where the tabs are connected to the body, and the openings left in the body by the tabs.

An object of the present invention is to provide a connector with tabs that are attached to the body only through bends.

An object of the present invention is to provide a connector with C-shaped, arcuate tabs that optimally balance strength and the lightest possible connector material.

An object of the present invention is to provide a connector with tabs that bend back from their connection within the body of the connector to align with the nearest perimeter edge, the tabs having an internal bend that allows an aligned, right-angled connection between two structural members, in particular when the end of one abuts the side of the other.

An object of the present invention is to provide a connector with a pair of tabs, giving the optimal connection strength between the structural members.

An object of the present invention is to provide a connector with a body that is a nail prong plate, allowing it to be attached to the first structural member with the same hydraulic presses used to assemble conventional plated trusses, also joining chords of the first structural member.

An object of the present invention is to provide a connector with a plurality of tabs, each of which can be fastened to a separate chord of the second structural member.

An object of the present invention is to provide a nail prong plate that doubles as a hanger, allowing a first structural member to be supported by a second structural member through the connector.

An object of the present invention is to provide a connector with C-shaped, arcuate tabs that are each joined to the body of the connector at a pair of bends, fastening the body of the connector to the first structural member between each pair of bends for the strongest possible attachment.

DETAILED DESCRIPTION OF THE INVENTION

Figure 1:
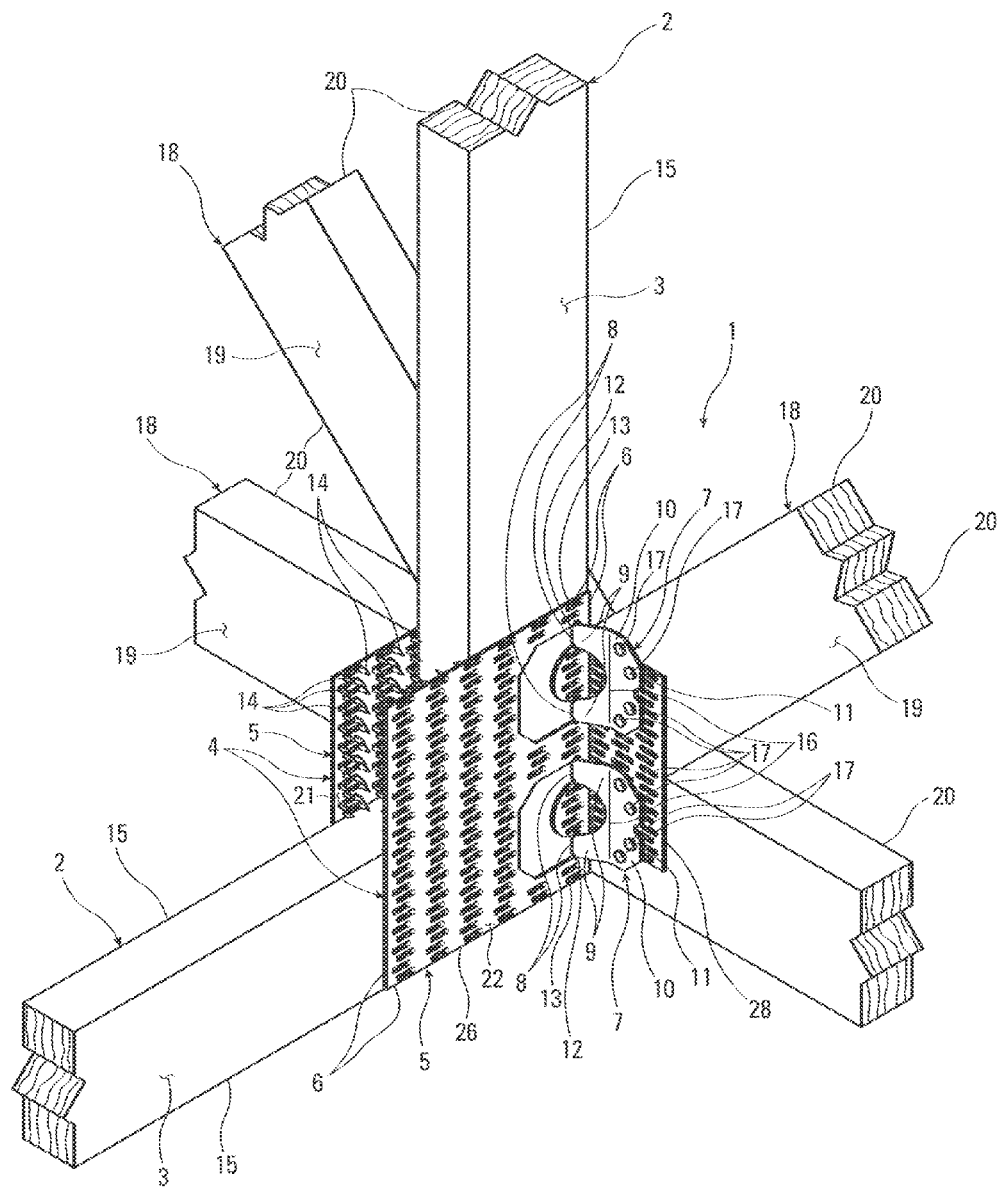
FIG. 1 is a perspective view of a double connection between the end of a supported jack truss and a supporting girder truss formed according to the present invention.

As shown in FIGS. 1, 2 and 7-15, the present invention is a building connection 1 between a first structural member 2 and a second structural member 18 made with a unique nail prong plate connector 4. The first structural member 2 has a first attachment surface 3. The second structural member 18 has a second attachment surface 19 angularly related to the first attachment surface 3 of the first structural member 2. The second structural member 18 supports the first structural member 2. Preferably, the first structural member 2 and the second structural member 18 are both plated roof trusses, but other structural members could be connected. The first attachment surface 3 and the second attachment surface 19 are preferably at right angles to each other.

As shown in FIGS. 3-6, the connector 4 has a body 5 and a first tab 7. The body 5 has a first perimeter edge 6, an attachment face 21 and an open face 22 opposite the attachment face 21. The body 5 is fastened to the first structural member 2 with the attachment face 21 interfacing with the first attachment surface 3 of the first structural member 2. The first tab 7 is joined to the body 5 at a first bend 8 located away from the first perimeter edge 6. The nail prong plate connector 4 is preferably formed from 18-gauge galvanized sheet steel, but other suitable materials could be used.

Figure 5:
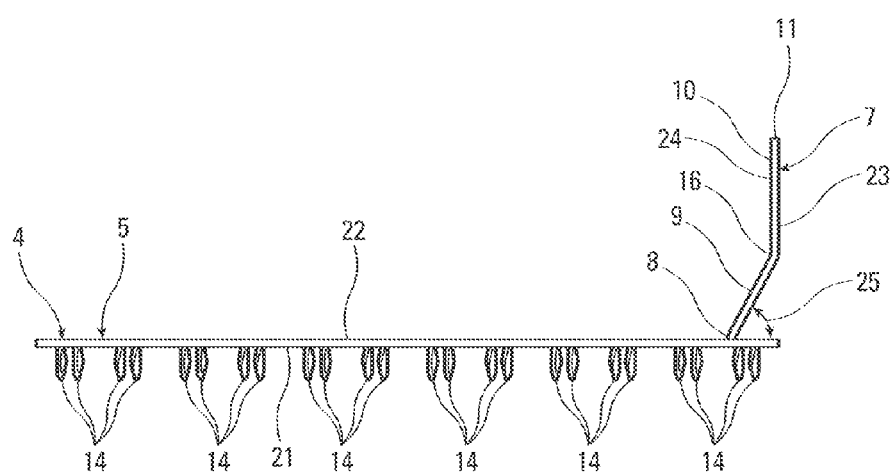
FIG. 5 is a bottom plan view of a connector formed according to the present invention.

As shown in FIG. 5, the first tab 7 has an attachment face 23 and an open face 24 opposite the attachment face 23, a first tab extension portion 9 joined to the first bend 8, and a first tab attachment portion 10. The first tab attachment portion 10 is joined to the first tab extension portion 9 and separated from the first bend 8 by the first tab extension portion 9. The first tab attachment portion 10 has a first free end 11 oriented away from the first tab extension portion 9. The first tab attachment portion 10 is fastened to the second structural member 18 with the attachment face 23 interfacing with the second attachment surface 19 of the second structural member 18.

Figure 3:
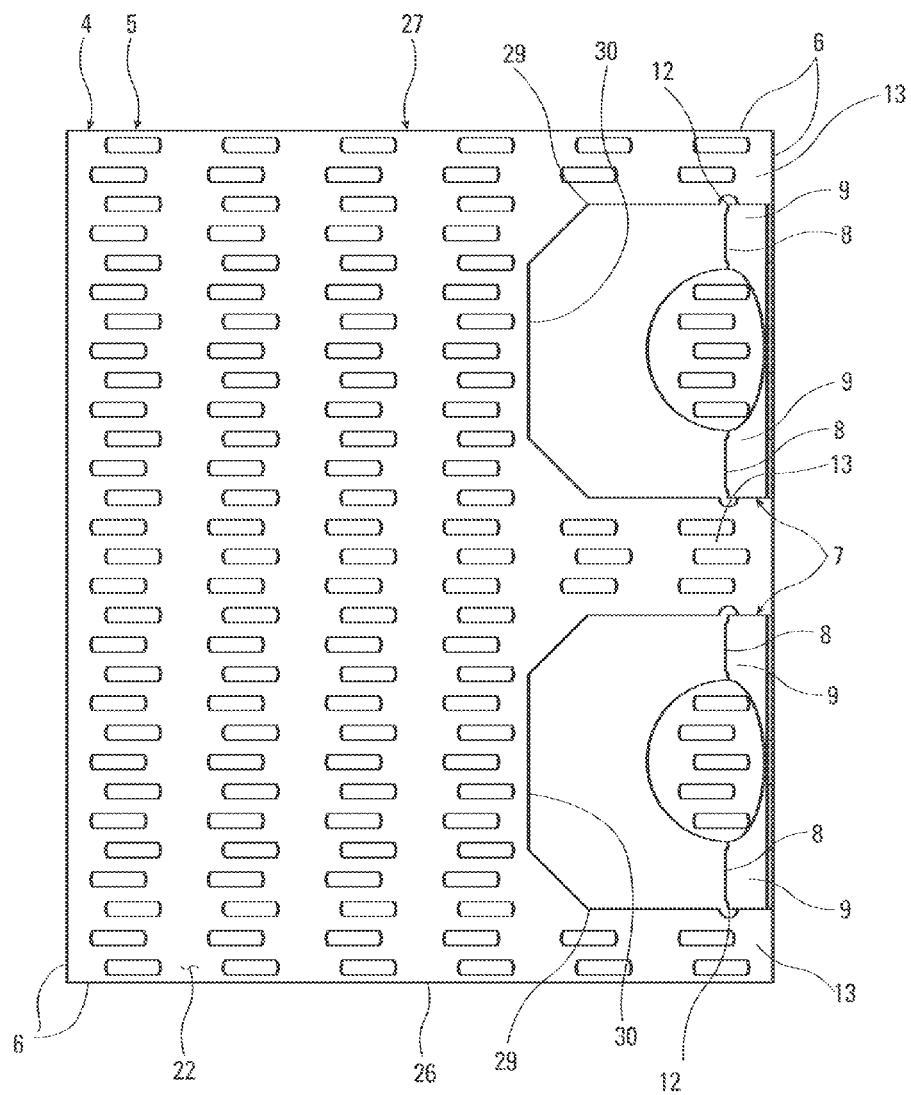
FIG. 3 is an right side elevation view of a connector formed according to the present invention.

As shown in FIG. 3, the first bend 8 has a first end 12 and the body 5 has first lateral portion 13 that extends beyond the first end 12 of the first bend 8. The first lateral portion 13 of the body 5 extends to either side (i.e., both sides) of the first bend 8. The bends 8 preferably all fall on a line parallel to the first perimeter edge 6; if the line were extended, it would intersect the two parallel perimeter edges 6 that meet the first perimeter edge 6 at right angles. The bends 8 are also preferably vertically elongated when the connection 1 is between two horizontally-related structural members 2 and 18.

As shown in FIG. 5, the first tab extension portion 9 and the first attachment portion 10 of the first tab 7 do not occupy a single plane. The first tab extension portion 9 and the open face 22 of the body 5 between the first bend 8 and the first perimeter edge 6 define a first acute angle 25. Rather than being bent from the first perimeter edge 6, the tabs 7 are preferably bent from within the body 5 of the nail prong plate connector 4, which allows the entire connector 4 to be made from thinner, lighter materials. It also means that the tabs 7 cannot simply be flat when making an orthogonal connection 1 if, as shown, the first structural member 2 and the first perimeter edge 6 both abut the second structural member 18. The tabs 7 themselves must bend in the opposite direction of the bends 8 that join them to the body 5 of the nail prong plate connector 4. Preferably, the first tab extension portion 9 does not make contact with the body 5 of the nail prong plate connector 4 except through the first bend 8. The tab 7 is preferably bent out and back from the body 5 of the nail prong plate connector 4.

Figure 6:
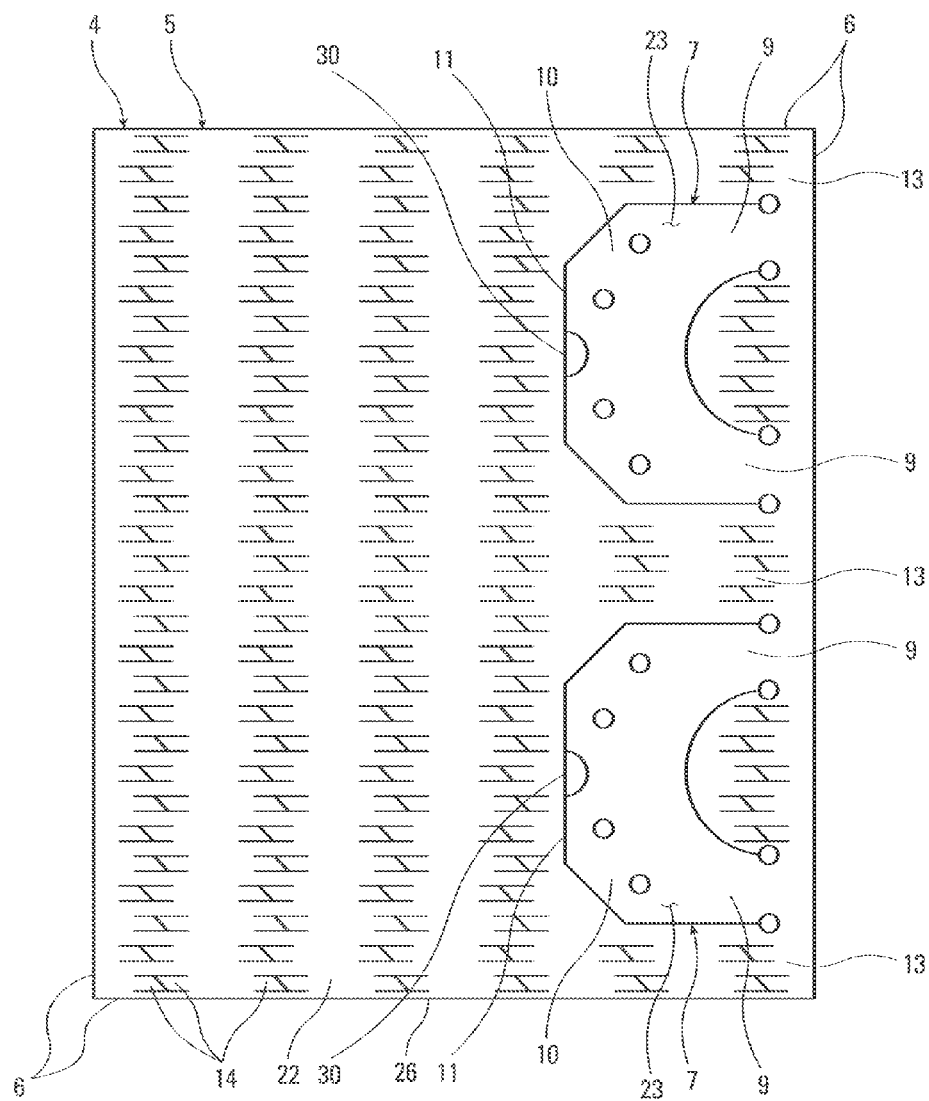
FIG. 6 is an outside elevation view of a blank for forming a connector according to the present invention.
Figure 7:
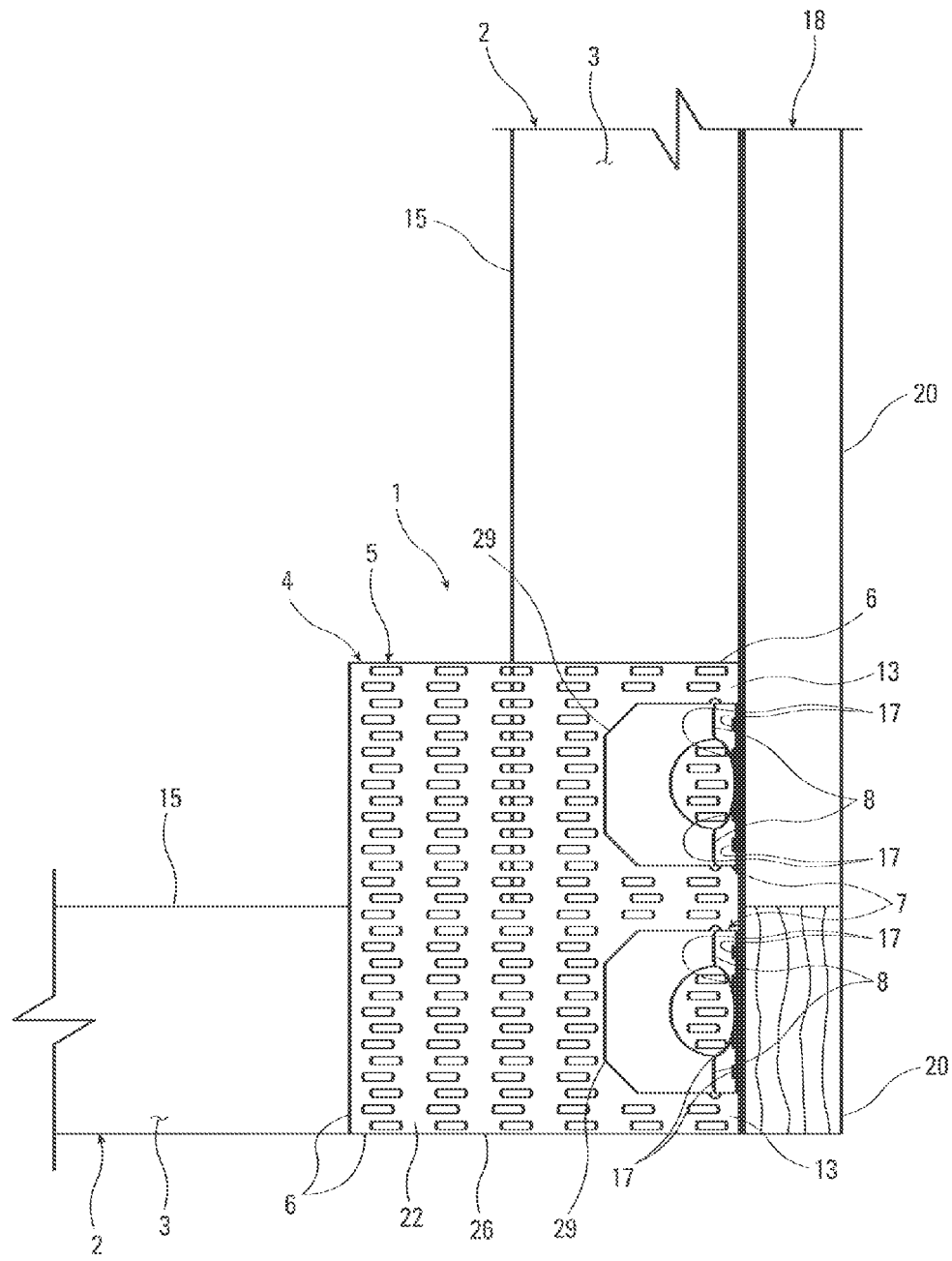
FIG. 7 is an right side elevation view of a connection between the end of a supported jack truss and a supporting girder truss formed according to the present invention.

As shown in FIGS. 3 and 6, a portion of the body 5 of the nail prong plate connector 4 preferably extends away from the first perimeter edge 6 further than the distance between the first bend 8 and the free end 11 of the first tab attachment portion 10. In other words, in the preferred forms of the invention, the body 5 of the nail prong plate connector 4 continues beyond the areas cut out to form the tabs 7 and leave the openings 29.

As shown in FIGS. 3 and 6, the first perimeter edge 6 preferably extends to the first lateral portion 13 of the body 5 of the nail prong plate connector 4. When the body 5 of the nail prong plate connector 4 is vertically oriented, as is preferred, the lateral portions 13 reach above and below the tabs 7 and the bends 8 through which they are attached to the body 5 of the nail prong plate connector 4.

Figure 8:
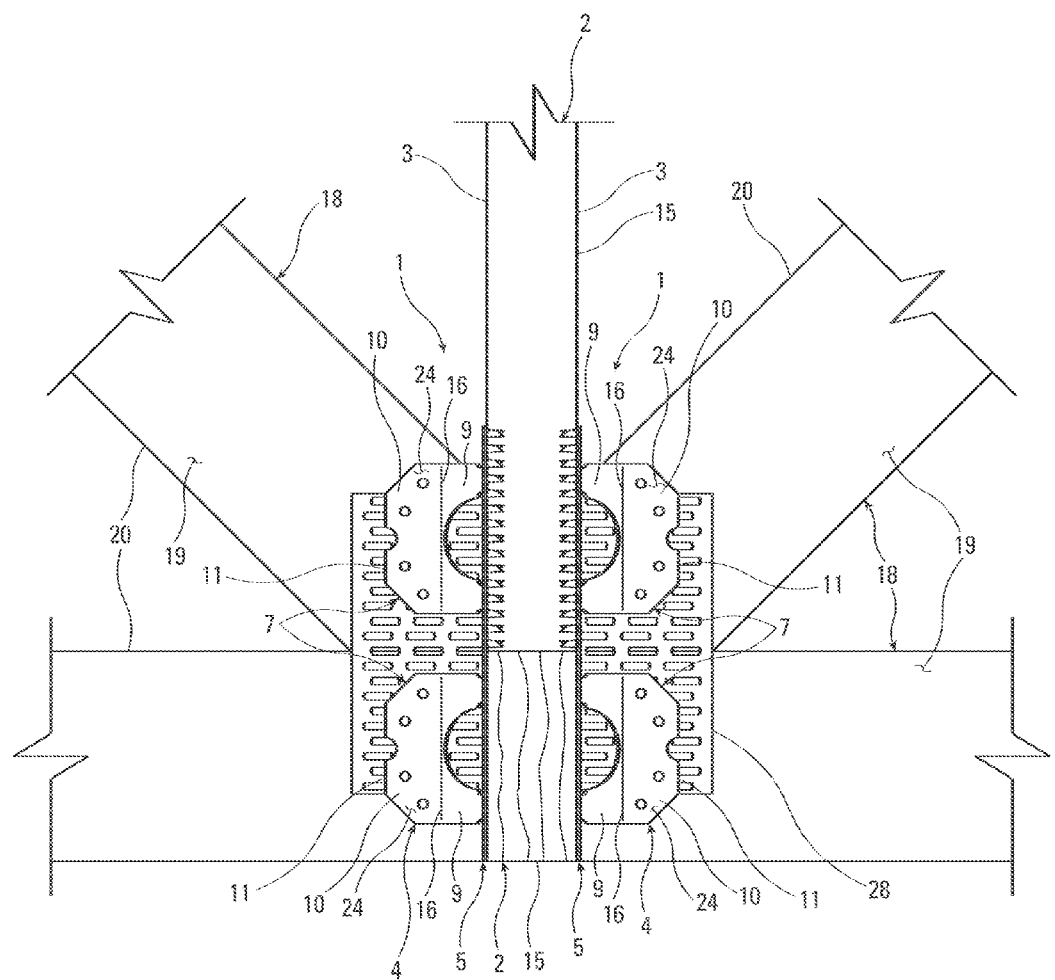
FIG. 8 is a front elevation view of a double connection between the end of a supported jack truss and a supporting girder truss formed according to the present invention.
Figure 9:
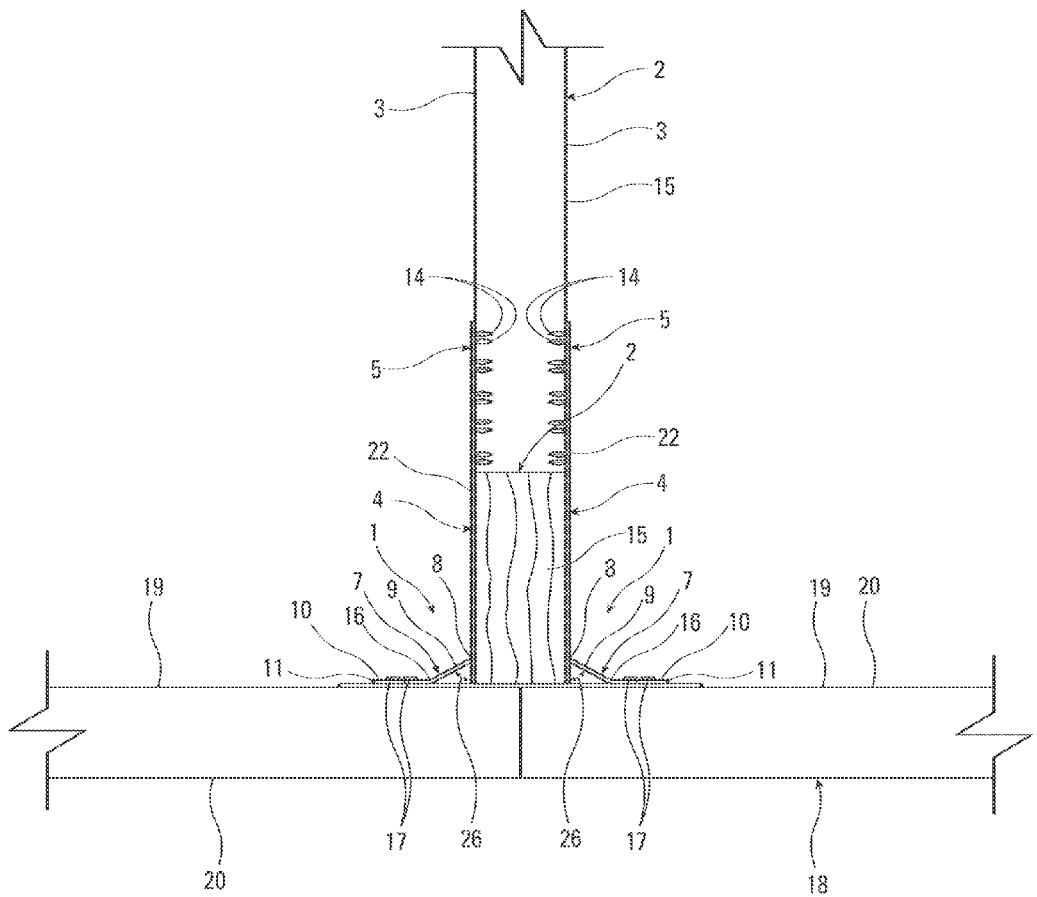
FIG. 9 is a top plan view of a double connection between the end of a supported jack truss and a supporting girder truss formed according to the present invention.
Figure 10:
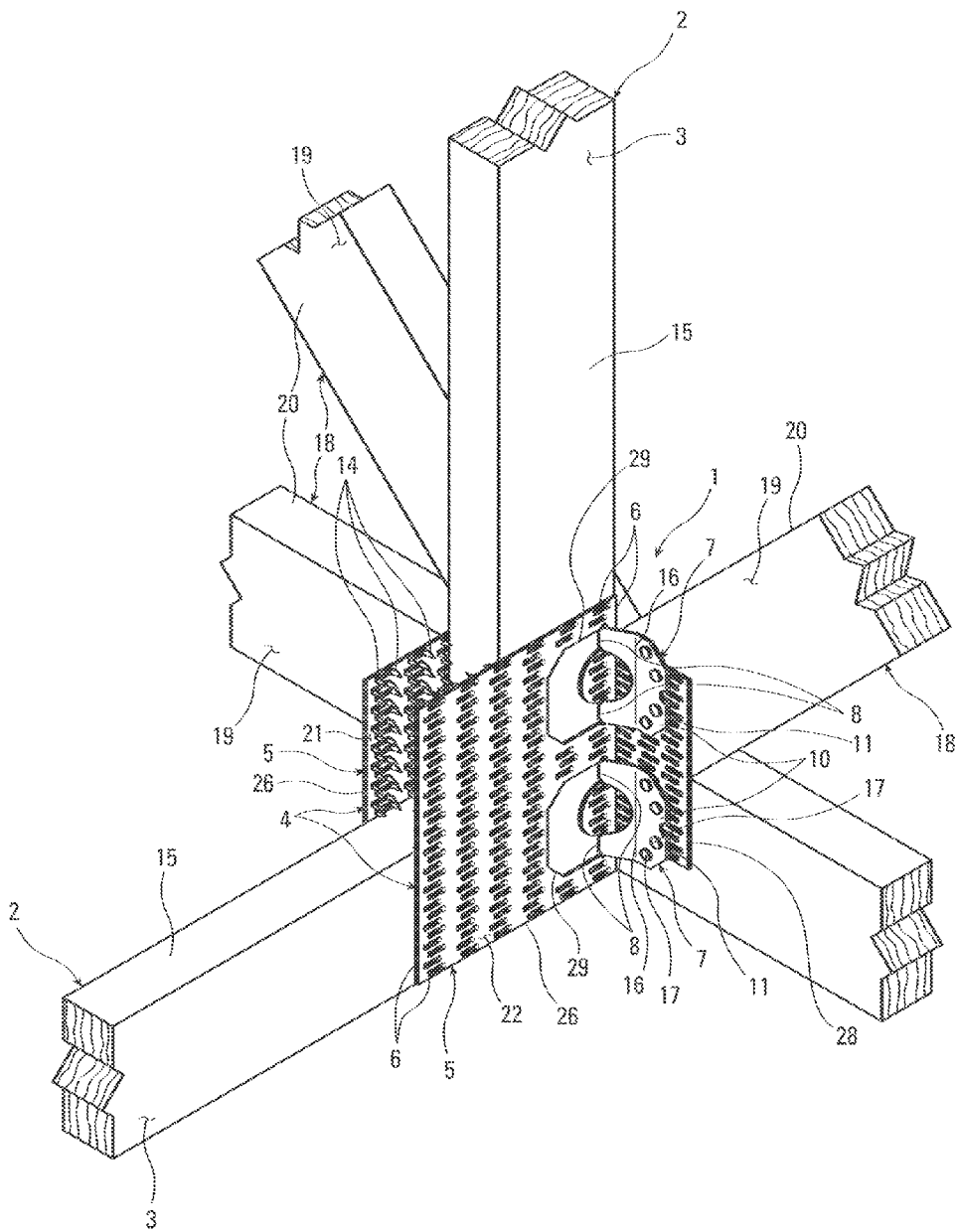
FIG. 10 is a perspective view of another double connection between the end of a supported jack truss and a supporting girder truss formed according to the present invention.
Figure 11:
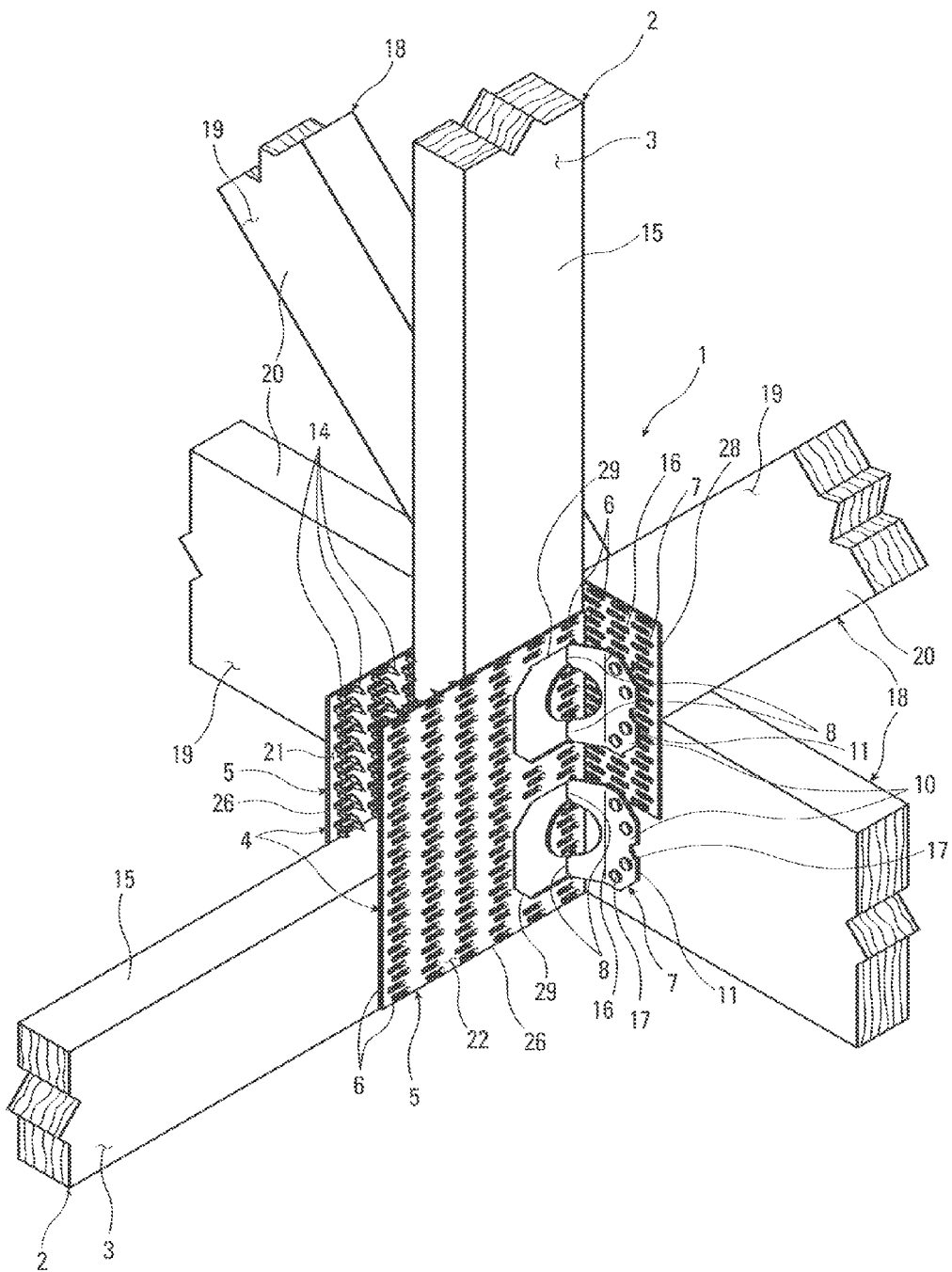
FIG. 11 is a perspective view of another double connection between the end of a supported jack truss and a supporting girder truss formed according to the present invention.
Figure 12:
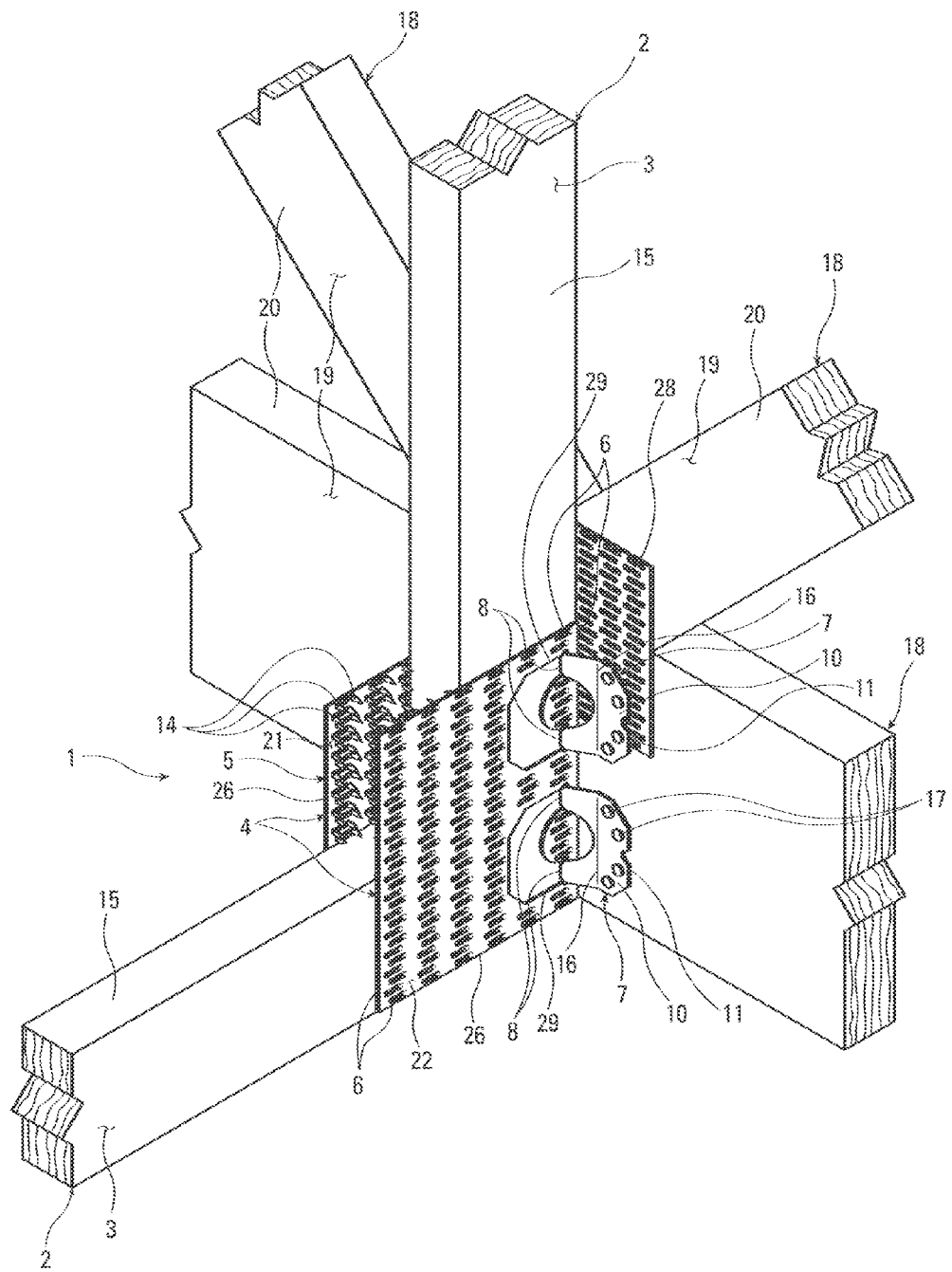
FIG. 12 is a perspective view of another double connection between the end of a supported jack truss and a supporting girder truss formed according to the present invention.
Figure 13:
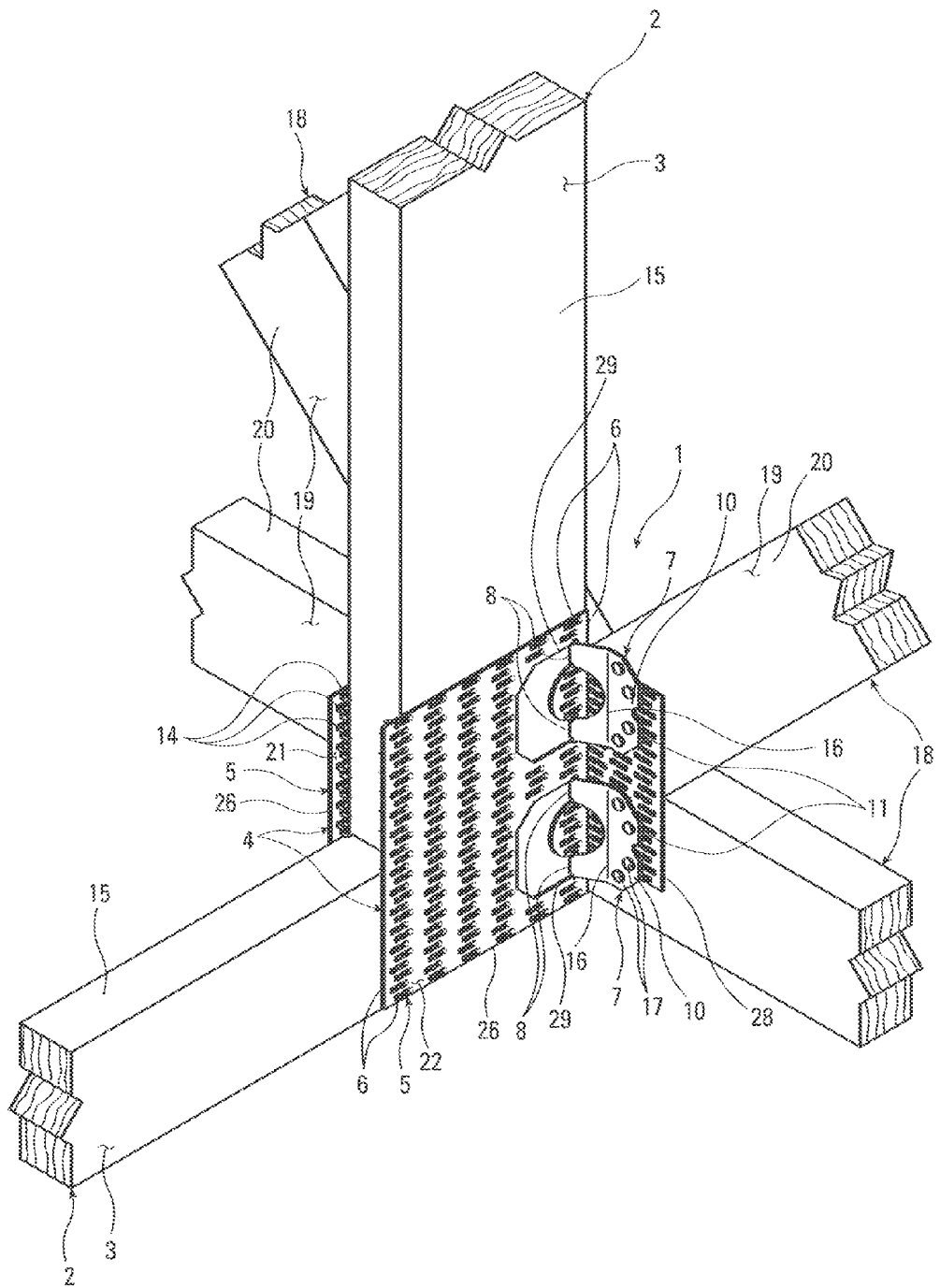
FIG. 13 is a perspective view of another double connection between the end of a supported jack truss and a supporting girder truss formed according to the present invention.
Figure 14:
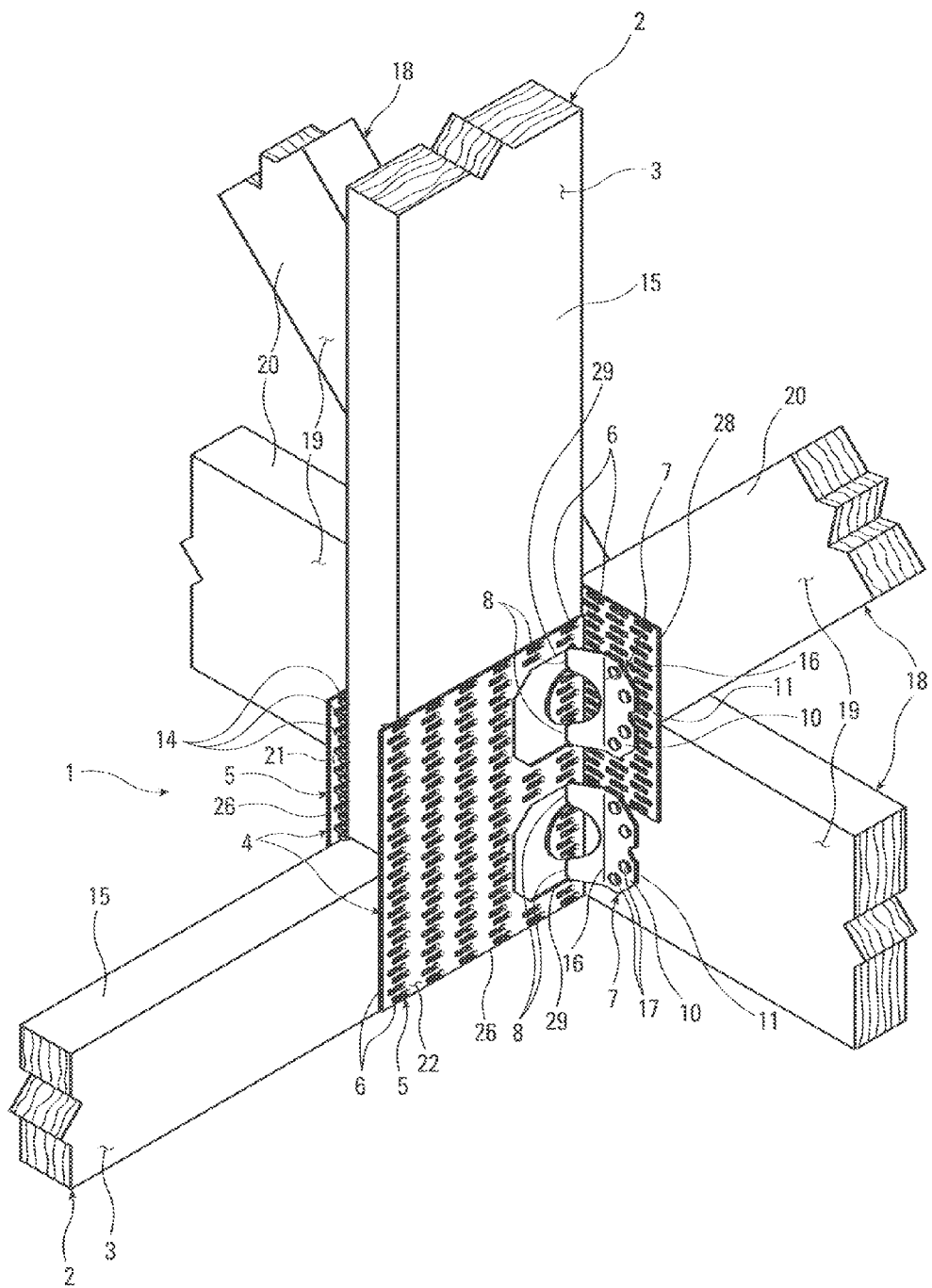
FIG. 14 is a perspective view of another double connection between the end of a supported jack truss and a supporting girder truss formed according to the present invention.
Figure 15:
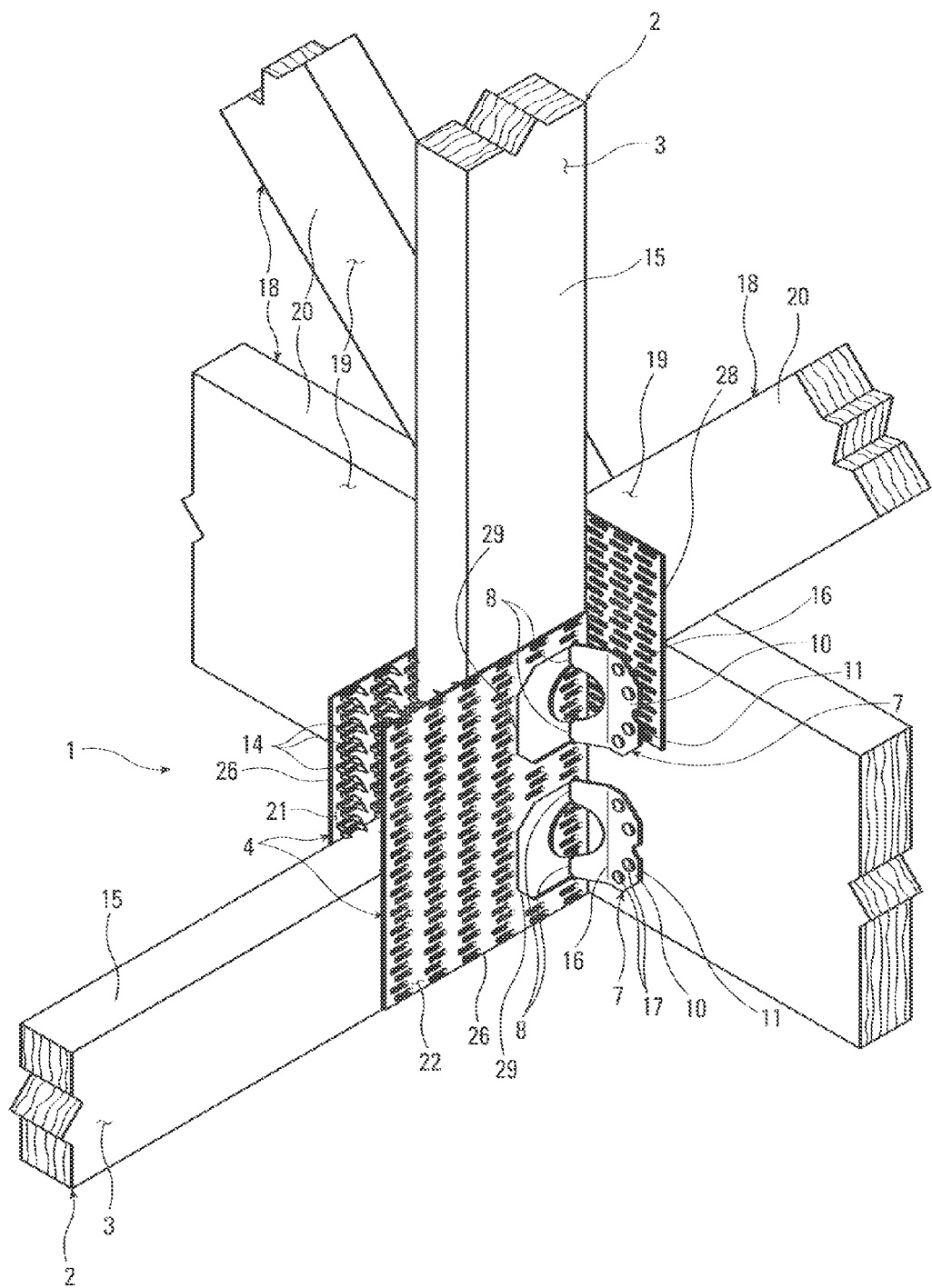
FIG. 15 is a perspective view of another double connection between the end of a supported jack truss and a supporting girder truss formed according to the present invention.

As shown in FIGS. 8 and 9, preferably the body 5 of the nail prong plate connector 4 has a plurality of protruding nail prongs 14 that are embedded in the first attachment surface 3 of the first structural member 2. The nail prongs 14 form a relatively dense grid, and in this the body 5 of the nail prong plate connectors 4 resembles nail prong plates that are conventionally used to form plated trusses.

As shown in FIGS. 1-4, 6-8 and 10-15, the nail prong plate connector 4 preferably has a second tab 7. The second tab 7 has a second tab attachment face 23 and a second open face 24 opposite the second tab attachment face 23. The second tab also has a second tab extension portion 9 joined to a second bend 8. And the second tab 7 has a second tab attachment portion 10 joined to the second tab extension portion 9 and separated from the second bend 8 by the second tab extension portion 9. The second tab attachment portion 10 has a second free end 11 oriented away from the second tab extension portion 9. The second tab attachment portion 10 is fastened to the second structural member 18 with the second attachment face 23 interfacing with the second attachment surface 19 of the second structural member 18. The first and second tabs 7 are preferably identical, with one positioned directly above the other.

As shown in FIGS. 3 and 6, the second bend 8 has a second end 12 and the body 5 has second lateral portion 13 that extends beyond the second end 12 of the second bend 8. The second lateral portion 13 of the body 5 extends to either side of the second bend 8. The second tab extension portion 9 and the second attachment portion 10 of the first tab 7 do not occupy a single plane. The second attachment face 23 of the second tab extension portion 9 and the open face 22 of the body 5 between the second bend 8 and the first perimeter edge 6 define a second acute angle 25. The first and second lateral portions 13 are preferably bordered by perimeter edges 6 that extend perpendicularly from the first perimeter edge 6. Preferably, there is a third lateral portion 13 between the first and second tabs 7 that also extends to both sides of the bends 8.

As shown in FIGS. 3 and 6, preferably the first perimeter edge 6 is one of a plurality of perimeter edges 6 that comprise the outer boundary 26 of the body 5 of the nail prong plate connector 4. The body 5 of the nail prong plate connector 4 is preferably rectangular, with four perimeter edges 6. The first bend 8 preferably is entirely within the outer boundary 26 and the first tab 7 does not intersect the outer boundary 26. Preferably, the tabs 7, the bends 8 that join them to the body 5 of the nail prong plate connector 4, and the openings 29 left in the body 5 by the material removed to make the tabs are all within the outer boundary 26 of the body. The body 5 preferably surrounds each tab 7. The openings 29 each have an edge portion 30 that corresponds to the free ends 11 of the tabs 7 and the body 5 preferably extends substantially beyond that edge portion 30 away from the first perimeter edge 6.

Figure 4:
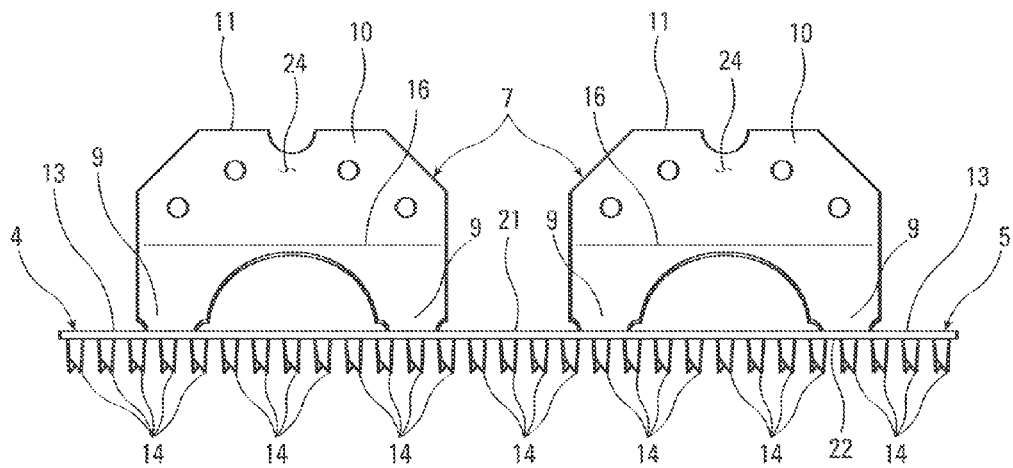
FIG. 4 is a front elevation view of a connector formed according to the present invention.

As shown in FIG. 4, preferably each tab 7 has first and second extension portions 9 joined to the body 5 of the nail prong plate connector 4 at two separate bends 8, respectively. The attachment portion 10 of each tab 7 preferably connects the first and second extension portions 9 of each tab.

As shown in 3, 6 and 7, preferably the bends 8 joining each tab 7 to the body 5 of the nail prong plate connector 4 are linear and linearly aligned. Each tab 7 preferably is generally arcuate, with the first and second bends 8 at respective ends of the arc. As shown in FIG. 6, which shows the cut but unbent sheet metal blank 27 from which the nail prong plate connector 4 is formed, the tabs 7 are preferably flat and C-shaped or arcuate before they are bent up from the body 5.

As shown in FIGS. 1 and 7-15, preferably the first structural member 2 is supported by the second structural member 18 through the nail prong connector 4. The first and second structural members 2 preferably are trusses 2. Preferably, the body 5 of the nail prong plate connector 4 is attached to a vertical chord 15 and a horizontal chord 15 of the first structural member 2. In this manner, the body 5 of the nail prong plate connector 4 holds together two chords 15 of the first structural member 2 and the same connector 4 is used to hang that first structural member 2 from the second structural member 18. Each tab 7 preferably is fastened to a different chord 20 of the second structural member 18. Preferably, the first structural member 2 is a jack truss 2 and the second structural member 18 is a girder truss 2.

As shown in FIG. 5, each tab 7 preferably has an obtuse angled juncture 16 between the open face 24 of each tab extension portion 9 and the open face 24 of each tab attachment portion 10.

Figure 2:
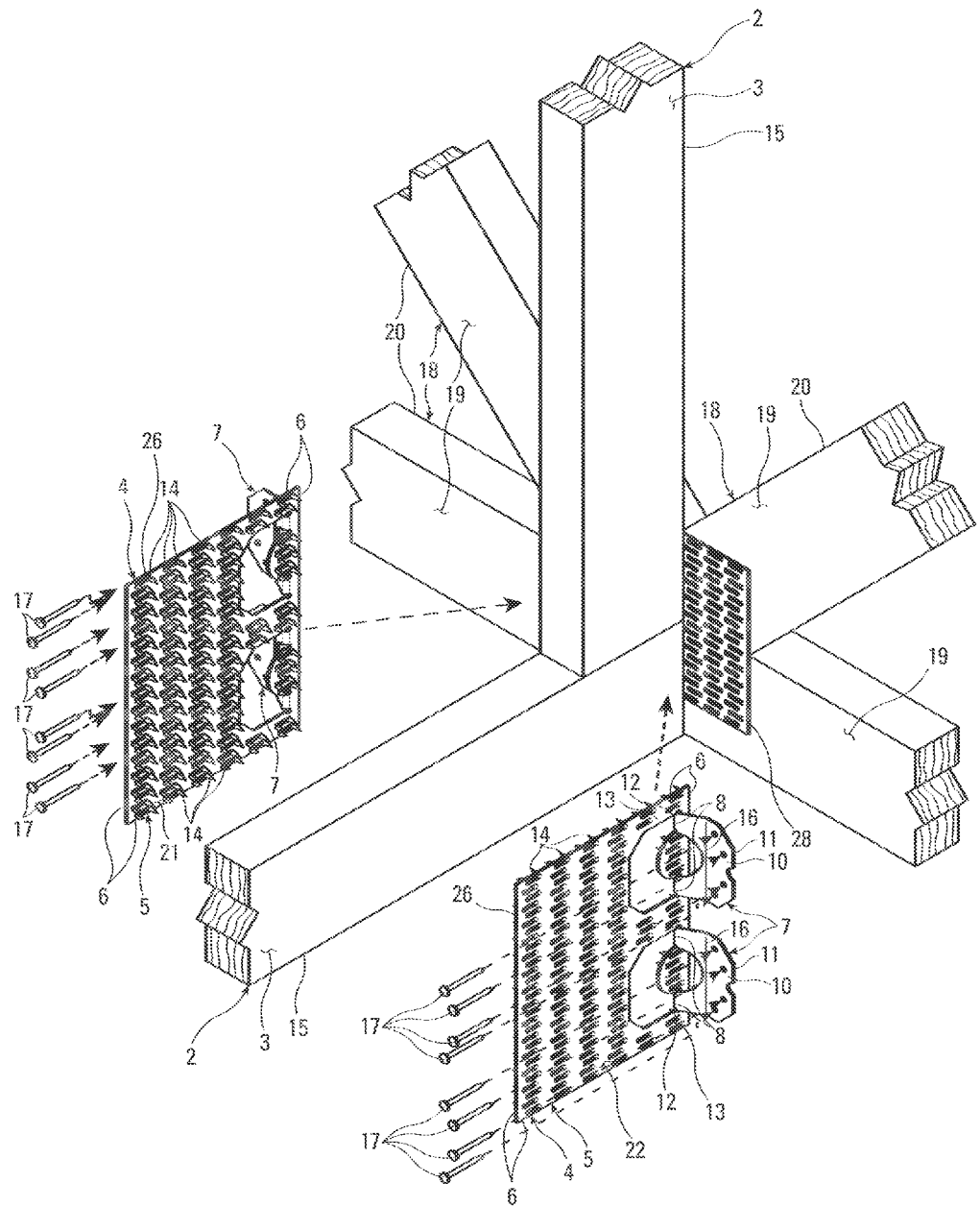
FIG. 2 is an exploded perspective view of forming a double connection end of a supported jack truss and a supporting girder truss according to the present invention.

As shown in FIGS. 8 and 9, preferably the body 5 of the nail prong plate connector 4 is fastened to the first structural member 2 with integral nail prongs 17 that project from the attachment face 21 of the body 5. Each tab 7 preferably is fastened to the second structural member 18 with separate fasteners 17. As shown in FIGS. 1 and 2, the separate fasteners 17 are preferably nails that are driven through the tabs 7 and into the second structural member 18. As also shown, at least some of the separate fasteners 17 preferably pass through other nail prong plates 28 that join the chords 20 of the second structural member 18.

As shown in FIGS. 1, 7, and 9-15, preferably the first perimeter edge 6 of the body 5 of the nail prong plate connector 4 abuts the second attachment surface 19 of the second structural member 18. This helps maximize the area over which the body 5 is attached to the first structural member 2.

As shown in FIGS. 1 and 10-15, the body 5 of the nail prong plate connector 4 preferably is fastened to the first structural member 2 between every pair of bends 8, thereby stabilizing the tabs 7 and strengthening the connection 1 between the structural members 2 and 18.

The invention claimed is:

1. A building connection (1) comprising:
   a. a first structural member (2) with a first attachment surface (3);
   b. a second structural member (18) with a second attachment surface (19) angularly related to the first attachment surface (3) of the first structural member (2), the second structural member (18) supporting the first structural member (2); and
   c. a connector (4) having:
      i. a body (5) with a first perimeter edge (6), an attachment face (21) and an open face (22) opposite the attachment face (21), the body (5) being fastened to the first structural member (2) with the attachment face (21) interfacing with the first attachment surface (3) of the first structural member (2); and
      ii. a first tab (7) joined to the body (5) at a first bend (8) located away from the first perimeter edge (6), the first tab (7) having:
         (a) a first tab attachment face (23) and a first open face (24) opposite the first tab attachment face (23);
         (b) a first tab extension portion (9) joined to the first bend (8); and
         (c) a first tab attachment portion (10) joined to the first tab extension portion (9) and separated from the first bend (8) by the first tab extension portion (9), the first tab attachment portion (10) having a first free end (11) oriented away from the first tab extension portion (9), the first tab attachment portion (10) being fastened to the second structural member (18) with the attachment face (23) interfacing with the second attachment surface (19) of the second structural member (18), wherein:
            i. the first bend (8) has a first end (12) and the body (5) has a first lateral portion (13) that extends beyond the first end (12) of the first bend (8);
            ii. the first lateral portion (13) of the body (5) extends to either side of the first bend (8);
            iii. the first tab extension portion (9) and the first attachment portion (10) of the first tab (7) do not occupy a single plane; and
            iv. the attachment face (23) of the first tab extension portion (9) and the open face (22) of the body (5) between the first bend (8) and the first perimeter edge (6) define a first acute angle (25); and
         wherein:
      (d) the body (5) of the connector (4) has an outer boundary (26), the first perimeter edge (6) is one of a plurality of perimeter edges (6) that comprise the outer boundary (26) of the body (5) of the connector (4), and the first bend (8) is entirely within the outer boundary (26), and the first tab (7) does not intersect the outer boundary (26), and the body (5) of the connector (4) has a plurality of protruding nail prongs (14) that are embedded in the first attachment surface (3) of the first structural member (2); and wherein
      (e) an additional lateral portion (13) is provided at the other end of the bend (8), the additional lateral portion (13) extending to both sides of the bend (8), and the lateral portions (13) at the end of the bend (8) have protruding nail prongs on both sides of the bend (8).

2. The building connection (1) of claim 1 wherein:
   a. a portion of the body (5) of the connector (4) extends away from the first perimeter edge (6) further than the distance between the first bend (8) and the free end (11) of the first tab attachment portion (10).

3. The building connection (1) of claim 2 wherein:
   a. the first tab extension portion (9) does not make contact with the body (5) of the connector (4) except through the first bend (8).

4. The building connection (1) of claim 3 wherein:
   a. the first perimeter edge (6) extends to the first lateral portion (13) of the body (5) of the connector (4).

5. The building connection (1) of claim 1 wherein:
   a. the first tab (7) has first and second extension portions (9) joined to the body (5) of the connector (4) at two separate bends (8), respectively; and
   b. the attachment portion (10) of each tab (7) connects the first and second extension portions (9) of each tab.

6. The building connection (1) of claim 5 wherein:
   a. the bends (8) joining the first tab (7) to the body (5) of the connector (4) are linear and linearly aligned.

7. The building connection (1) of claim 6 wherein:
   a. the first tab (7) is generally arcuate, with the first and second bends (8) at respective ends of the arc.

8. The building connection (1) of claim 7 wherein:
   a. the first tab (7) has an obtuse angled juncture (16) between the open face (24) of each tab extension portion (9) and the open face (24) of each tab attachment portion (10).

9. The building connection (1) of claim 8 wherein:
   a. the connector (4) has a second tab (7) having:
      i. a second tab attachment face (23) and a second open face (24) opposite the second tab attachment face (23);

ii. a second tab extension portion (9) joined to a second bend (8); and iii. a second tab attachment portion (10) joined to the second tab extension portion (9) and separated from the second bend (8) by the second tab extension portion (9), the second tab attachment portion (10) having a second free end (11) oriented away from the second tab extension portion (9), the second tab attachment portion (10) being fastened to the second structural member (18) with the second tab attachment face (23) interfacing with the second attachment surface (19) of the second structural member (18), wherein:

a. the second bend (8) has a second end (12) and the body (5) has second lateral portion (13) that extends beyond the second end (12) of the second bend (8);

b. the second lateral portion (13) of the body (5) extends to either side of the second bend (8);

c. the second tab extension portion (9) and the second attachment portion (10) of the first tab (7) do not occupy a single plane; and d. the second attachment face (23) of the second tab extension portion (9) and the open face (22) of the body (5) between the second bend (8) and the first perimeter edge (6) define a second acute angle (25).

10. The building connection (1) of claim 1 wherein:

a. the body (5) of the connector (4) is fastened to the first structural member (2) with integral nail prongs (14) that project from the attachment face (21) of the body (5); and b. each tab (7) is fastened to the second structural member (18) with separate fasteners (17).

11. The building connection (1) of claim 10 wherein:

a. the first structural member (2) has a plurality of chords (15); and a. the body (5) of the connector (4) is attached to a vertical chord (15) and a horizontal chord (15) of the first structural member (2).

12. The building connection (1) of claim 11 wherein:

a. the second structural member (18) has a plurality of chords (20); and a. each tab (7) is fastened to a different chord (20) of the second structural member (18).

13. The building connection (1) of claim 12 wherein:

a. the first structural member (2) is supported by the second structural member (18) through the nail prong connector (4).

14. The building connection (1) of claim 13 wherein:

a. the first and second structural members (2) are trusses (2).

15. The building connection (1) of claim 14 wherein:

a. the first structural member (2) is a jack truss (2) and the second structural member (18) is a girder truss (2).

16. The building connection (1) of claim 15 wherein:

a. the first perimeter edge (6) of the body (5) of the connector (4) abuts the second attachment surface (19) of the second structural member (18).

17. The building connection (1) of claim 16 wherein:

a. the body (5) of the connector (4) is fastened to the first structural member (2) between every pair of bends (8).

\* \* \* \* \*